UNITED STATES PATENT OFFICE.

MAURICE BEUDET, OF LYON, FRANCE, ASSIGNOR TO SOCIETE CHIMIQUE DES USINES DU RHONE, ANCIENNEMENT GILLIARD, P. MONNET ET CARTIER, OF PARIS, FRANCE.

MANUFACTURE OF ETHYLIDENE DIACETATE.

1,351,990.   Specification of Letters Patent.   Patented Sept. 7, 1920.

No Drawing.   Application filed March 22, 1919. Serial No. 284,373.

*To all whom it may concern:*

Be it known that I, MAURICE BEUDET, a citizen of the Republic of France, of 25 Rue Bugeaud, Lyon, France, have invented certain new and useful Improvements in the Manufacture of Ethylidene Diacetate, of which the following is a specification.

This invention relates to the process of obtaining ethylidene diacetate by the action of acetylene on acetic acid as described in a pending application for a United States patent of which I am one of the applicants, Serial No. 206,124.

In the process described in the said pending application and in various analogous processes, a mixture is obtained of ethylidene diacetate, acetic acid, and mercury salts, accompanied by products of decomposition and of reduction of these salts.

Up to the present this mixture has been submitted to fractional distillation, in which the acetic acid distils first and the ethylidene diacetate afterward.

The applicant has found that this process involves losses and that far better yields of diacetate can be obtained by decanting the product of reaction, pouring it into water and agitating it with an appropriate solvent; in this manner a pure and neutral solution of ethylidene diacetate is obtained which can be distilled without difficulty.

*Example.*—The solution resulting from the absorption of acetylene in 2,000 parts of anhydrous acetic acid and 160 parts of naphthalene sulfonate of mercury is decanted; it is poured into 5,000 parts of water and is agitated with 1,500 parts of benzene; the benzene solution is carefully washed and dried and yields on rectification 1,520 parts of ethylidene diacetate; the aqueous solution enabling the recovery of 740 parts of acetic acid to be obtained.

What I claim and desire to secure by Letters Patent is:—

1. The process of purifying the crude products of the preparation of ethylidene diacetate obtained by the action of acetylene on acetic acid in presence of mercury compounds, consisting in decanting and diluting said crude products, agitating the solution with an organic solvent of ethylidene diacetate non miscible with water, washing and drying the solution, and separating the ethylidene diacetate by distillation.

2. The process of purifying the crude products of the preparation of ethylidene diacetate obtained by the action of acetylene on acetic acid in the presence of mercury compounds, consisting in decanting and diluting said products, agitating the solution with benzene, washing and drying the benzene solution, and separating the ethylidene diacetate by distillation.

In testimony whereof I have signed my name to this specification.

MAURICE BEUDET.

Witnesses:
FRANK B. HALL, Jr.,
LOUIS ERCHER.